(12) United States Patent
Clark et al.

(10) Patent No.: US 9,783,377 B2
(45) Date of Patent: Oct. 10, 2017

(54) MATERIAL UNLOADER SYSTEM

(71) Applicant: Android Industries LLC, Auburn Hills, MI (US)

(72) Inventors: Barry Allan Clark, Ortonville, MI (US); David Henry Larson, Swartz Creek, MI (US); Lawrence J. Lawson, Troy, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

(21) Appl. No.: 14/931,187

(22) Filed: Nov. 3, 2015

(65) Prior Publication Data

US 2016/0159586 A1 Jun. 9, 2016

Related U.S. Application Data (60) Provisional application No. 62/086,952, filed on Dec. 3, 2014.

(51) Int. Cl.

| | | |
|---|---|---|
| *B65G 67/24* | (2006.01) | |
| *B65G 47/90* | (2006.01) | |
| *B66C 1/66* | (2006.01) | |
| *B66C 23/18* | (2006.01) | |

(52) U.S. Cl.
CPC ............. *B65G 67/24* (2013.01); *B65G 47/90* (2013.01); *B66C 1/66* (2013.01); *B66C 23/18* (2013.01)

(58) Field of Classification Search
CPC ...... B65G 13/12; B65G 17/28; B65G 41/003; B65G 41/02; B65G 47/90; B65G 47/902; B65G 67/24; B66C 1/42; B66C 1/425; B66C 1/66; B66C 3/00; B66C 23/18; B66C 23/163
See application file for complete search history.

(56) References Cited

U.S. PATENT DOCUMENTS

| | | | |
|---|---|---|---|
| 3,811,579 A | 5/1974 | Black | |
| 3,853,230 A | 12/1974 | Schultz | |
| 3,866,768 A * | 2/1975 | Weir | ...................... B65G 67/08 198/510.1 |
| 4,103,795 A | 8/1978 | Miller | |

(Continued)

OTHER PUBLICATIONS

"LinkLift the lift system for the entertainment industry" Technical Guide, Fourth Edition, Revision A Apr. 2014, (16 pages).

*Primary Examiner* — Mark Beauchaine
(74) *Attorney, Agent, or Firm* — Honigman Miller Schwartz and Cohn LLP (57) ABSTRACT

A tire unloader includes a mobile support structure, a robotic device supported by the mobile support structure, and a drive system. The drive system maneuvers the robotic device. The robotic device includes an engagement mechanism. The mobile support structure positions the robotic device to allow for engagement, lifting, and unloading stacks of tires. A remote user optionally controls the movement of the mobile support structure and the operational actions of the robotic device. A material conveyer optionally receives the unloaded material. A second robotic device located near the second end of the material conveyer optionally engages the unloaded tires on the conveyer and transfers the unloaded tires onto the transporting cart, which transports the unloaded material to a predetermined location.

25 Claims, 10 Drawing Sheets

(56) References Cited

U.S. PATENT DOCUMENTS

| | | | |
|---|---|---|---|
| 4,252,495 A | | 2/1981 | Cook |
| 4,289,442 A | | 9/1981 | Stevens |
| 4,460,064 A | | 7/1984 | Lutz et al. |
| 4,640,657 A | | 2/1987 | Moore et al. |
| 4,801,238 A | | 1/1989 | Pezzolato |
| 4,941,794 A | | 7/1990 | Hara et al. |
| 4,946,027 A | | 8/1990 | Jenkins |
| 5,092,106 A | | 3/1992 | Doster et al. |
| 5,391,038 A | | 2/1995 | Stewart |
| 5,403,142 A | | 4/1995 | Stewart |
| 5,697,753 A | | 12/1997 | Aurora et al. |
| 6,006,893 A | | 12/1999 | Gilmore et al. |
| 6,098,531 A | | 8/2000 | Reinert, Sr. |
| 6,362,443 B1 * | | 3/2002 | Kinoshita .......... B29D 30/0016 209/574 |
| 6,379,107 B1 | | 4/2002 | Iwasaki et al. |
| 6,527,499 B2 | | 3/2003 | Leimbach et al. |
| 8,540,438 B1 * | | 9/2013 | Cronin .................. B66F 11/048 396/428 |
| 9,393,686 B1 * | | 7/2016 | Bradski ................... B25J 9/163 |
| 2004/0026210 A1 * | | 2/2004 | Flippo .................... B65G 13/12 193/35 TE |
| 2006/0088405 A1 | | 4/2006 | Leimbach et al. |
| 2014/0199142 A1 * | | 7/2014 | Criswell ................. B25J 15/00 414/395 |
| 2015/0249821 A1 * | | 9/2015 | Tanizumi ................. B60R 1/00 348/46 |

* cited by examiner

MATERIAL UNLOADER SYSTEM

CROSS-REFERENCE TO RELATED APPLICATIONS

This application claims the benefit of U.S. Provisional Patent Application No. 62/086,952 filed on Dec. 3, 2014, the entire disclosure of which is incorporated herein by reference.

TECHNICAL FIELD

This disclosure relates to the field of unloading tires.

BACKGROUND

The process of unloading large quantities of various materials or products, such as tires, often inefficiently consumes both time and man power.

When tires are stored, in a transporting vehicle or otherwise, they are often packed in tightly in order to store or transport as many tires as possible within a fixed amount of space. Accordingly, stacks of tires may be tightly positioned next to one another and may have heights that nearly reach the roof of the trailer, leaving minimal headroom above the top tire.

One common solution for unloading materials or products is the use of pallets. However, the use of pallets wastes space within the storage or transporting unit and, moreover, does not eliminate the inefficiencies associated with the unloading process. Other current unloading methods similarly fail to satisfactorily reduce the associated inefficiencies. Accordingly, there is a need in the art to develop a system that increases the efficiency of the unloading process by minimizing the manpower and the time required to unload materials or products.

SUMMARY

One aspect of the disclosure provides an unloader including a mobile support structure, a robotic device supported by the mobile support structure, and a drive system. The drive system maneuvers the robotic device. The robotic device includes an engagement mechanism. The mobile support structure positions the robotic device to allow for engagement, lifting, and unloading of a material. The robotic device deploys the engagement mechanism to engage the material.

Implementations of the disclosure may include one or more of the following features. In some implementations, communications signals from a remote user control the movement of the mobile support structure. In other implementations, communications signals from the remote user control the operational actions of the robotic device. Additionally, a material conveyor receives the unloaded material from the robotic device at its first end and conveys the unloaded material to its second end.

Another aspect of the disclosure provides an unloading device including a second robotic device located near the second end of the material conveyor and a transporting cart. The second robotic device engages the unloaded material at the second end of the conveyor and transfers the unloaded material to the transporting cart. The transporting cart transports the unloaded material to a predetermined location.

DESCRIPTION OF DRAWINGS

FIG. 4A is a side view of a tire unloader according to an exemplary embodiment of the invention. The size and configuration of the boom is exaggerated to illustrate its components. FIG. 4A shows the unloader positioning its end effector above the stack of tires to be unloaded.

Like reference symbols in the various drawings indicate like elements.

DETAILED DESCRIPTION

Exemplary embodiments of the invention are shown in FIGS. 1-7 and are embodied as a tire unloading system.

Figure 1:
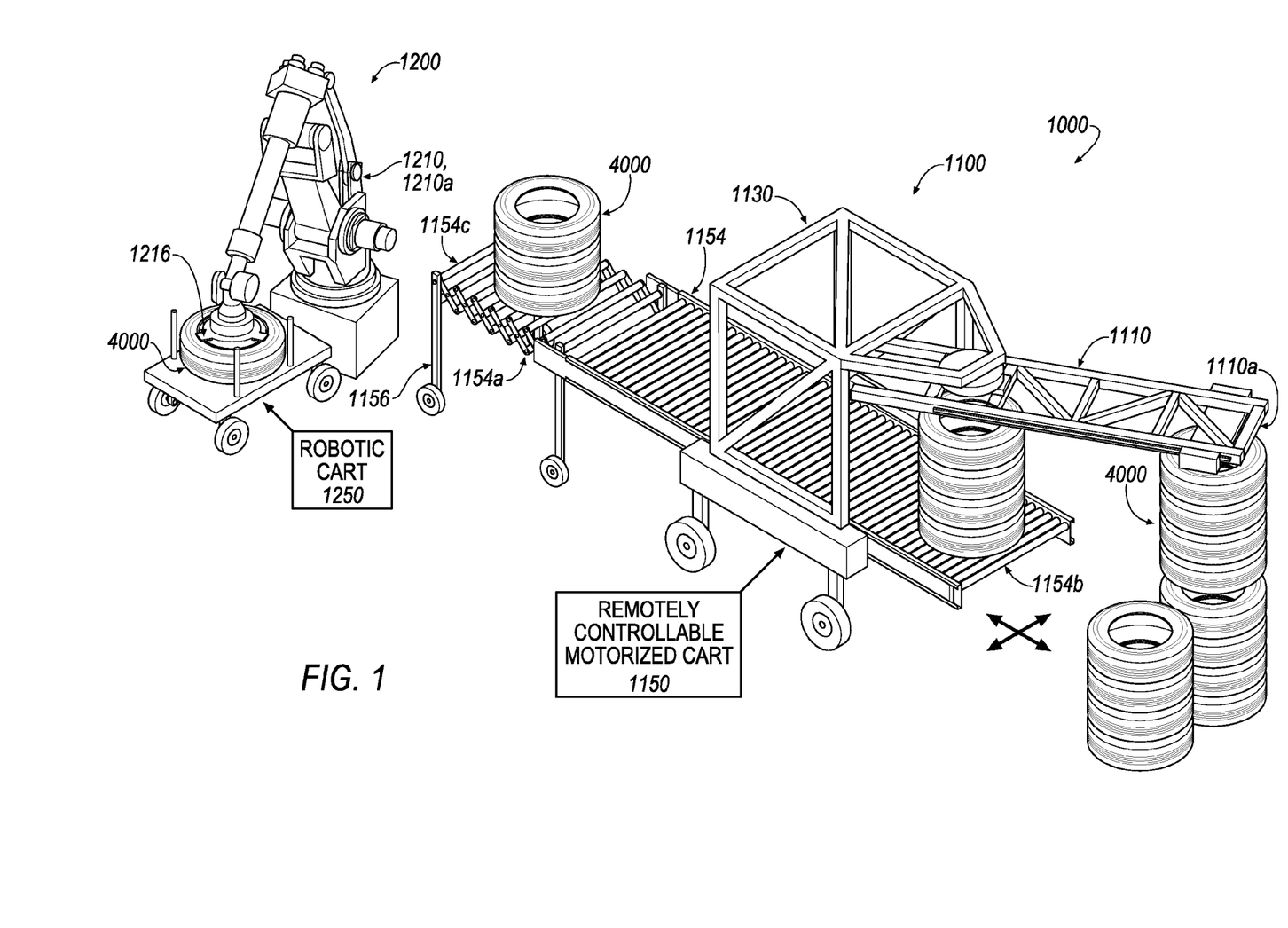
FIG. 1 is an isometric view of a tire unloading system according to an exemplary embodiment of the invention.

Referring to FIG. 1, the unloading system 1000 comprises an unloading portion 1100 and a destacking portion 1200. Stacks of tires 4000 are directed from the unloading portion 1100 of the unloading system 1000 to the destacking portion 1200 of the unloading system 1000 along a material conveyor 1154.

The unloading portion 1100 of the unloading system 1000 includes a robotic device and a mobile support structure that includes a boom 1110, a support structure 1130, and an unloading cart 1150. The support structure 1130 attaches to the unloading cart 1150 and supports the boom 1110.

The boom 1110 extends laterally from the support structure 1130 to its unloading end 1110a. The boom 1110 possesses the ability to rotate and also possesses the ability to extend its unloading end 1110a away from the support structure 1130 and to contract its unloading end 1110a back towards to support structure 1130. By extending from and contracting back towards the support structure 1130, the rotational radius of the unloading end 1110a of the boom 1110 varies in order to adapt for the particular unloading application.

In some implementations, the unloading end 1110a of the boom 1110 extends away from the support structure 1130 to provide the robotic device with access to the stack of tires 4000 to be unloaded. After the robotic device lifts the stack of tires 4000, the unloading end 1110a of the boom 1110 contracts back towards the support structure 1130 to unload the stack of tires 4000 onto the conveyor 1154. In other implementations, the boom 1110 utilizes its rotation capabilities to unload the lifted stack of tires 4000 onto the conveyor 1154.

The unloading cart 1150 shown in FIG. 1 is remotely controllable and motorized, allowing for a remote operator 3000 to control the position of the unloading portion 1100 of the unloading system 1000. Alternatively, the unloading cart 1150 can be motorized but controlled locally, or it can include no motor.

The conveyor 1154 is attached to the unloading cart 1150 such that the cart 1150 is movable M (see, e.g., FIG. 3) relative to the conveyor 1154 and includes an accordion-style conveyor portion 1154a. Other embodiments of the unloading system 1000 may consist of a conveyor 1154 without an accordion-style conveyor portion 1154a or a conveyor 1154 consisting entirely of an accordion-style conveyor 1154a.

The conveyor 1154 comprises a first end 1154b and a second end 1154c. According to the embodiment illustrated in FIG. 1, the conveyor support legs 1156 at the second end 1154c of the conveyor 1154 include wheels. However, in an alternate embodiment, the conveyor support legs 1156 at the second end 1154c of the conveyor 1154 are affixed to the ground to maintain the positioning of the second end 1154c of the conveyor 1154 within the proximity of the destacking portion 1200 of the unloading system 1000.

The destacking portion 1200 of the unloading system 1000 resides proximate the second end 1154c of the conveyor 1154. A destacker 1210 engages the tires 4000 at the second end 1154c the conveyor 1154, lifts the tires 4000, and deposits the tires 4000 onto the transporting cart 1250.

The destacker 1210 handles one or more tires 4000 at a time. As shown in FIG. 1, the destacker 1210 is capable of moving a single tire 4000 from the conveyor 1154 to the transporting cart 1250. However, dependent upon the particular desired operation, the destacker 1250 is also capable of moving more than one tire 4000 at a time. The whole stack of tires 4000, as loaded onto the conveyor 1154 by the unloading portion 1100 of the unloading system 1000, can be moved at once from the conveyor 1154 to the transporting cart 1250 by the destacker 1210.

The destacker 1210 is illustrated in FIG. 1 as a stationary destacking robot 1210a. Alternatively, the destacker 1210 could be mobile, attached to the conveyor 1154, or in any other configuration that permits the destacker 1210 to engage one or more tires 4000 at the second end 1154c of the conveyor 1154.

The destacker 1210 includes an end actuator 1216 equipped with an engagement mechanism for lifting and moving one or more tires 4000. In some embodiments, the engagement mechanism consists of one or more retractable members.

The transporting cart 1250 is illustrated in FIG. 1 as a robotic cart allowing for motorized transportation of one or more tires 4000 away from the unloading system 1000. Alternatively, the transporting cart 1250 can be motorized but not robotic, or it can include no motor.

The transporting cart 1250 transports one or more tires 4000 from the unloading area. In some embodiments, the remote user controls the movements of the transporting cart 1250 to accomplish transportation of the tires 4000 to a predetermined location. In other embodiments, the transporting cart 1250 utilizes a track or a pre-programmed travel path to transport the tires 4000 to a predetermined location.

Figure 2:
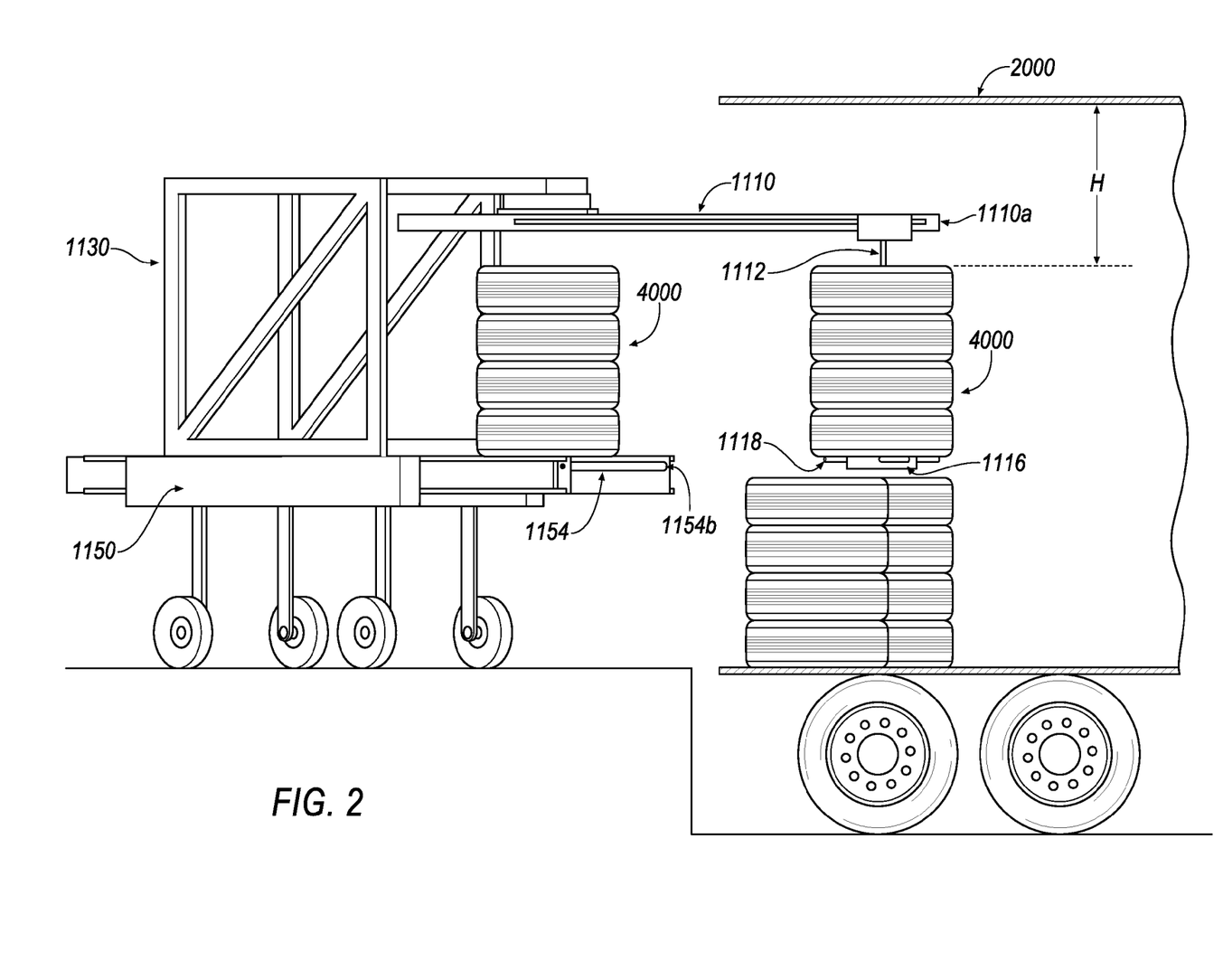
FIG. 2 is a side view of a tire unloader operating within a trailer according to an exemplary embodiment of the invention.

Referring to FIG. 2, a user directs the unloading cart 1150 to move to a location proximate one or more stacks of tires 4000 that are to be unloaded from a tire storage area, such as a transporting vehicle 2000. The headroom H available above the stack of tires 4000 in the transporting vehicle 2000 is often as small as 18-inches or less. Accordingly, the boom 1110 must be designed to allow for its unloading end 1110a to extend into small amounts of headroom H.

The unloading end 1110a of the boom 1110 lowers the robotic device, which consists of an extendable support column 1112 attached to an end effector 1116 with retractable fingers 1118, into the center of a stack of tires 4000, allowing the robotic device to engage and unload the stack of tires 4000. The conveyor 1154, which is attached to the unloading cart 1150 such that the cart 1150 is movable M (see, e.g., FIG. 3) relative to the conveyor 1154, receives the stack of tires 4000 from the robotic device's end effector 1116. To unload the stack of tires 4000 onto the conveyor 1154, the end effector 1116 retracts its retractable fingers 1118, disengaging the stack of tires 4000.

Figure 3:
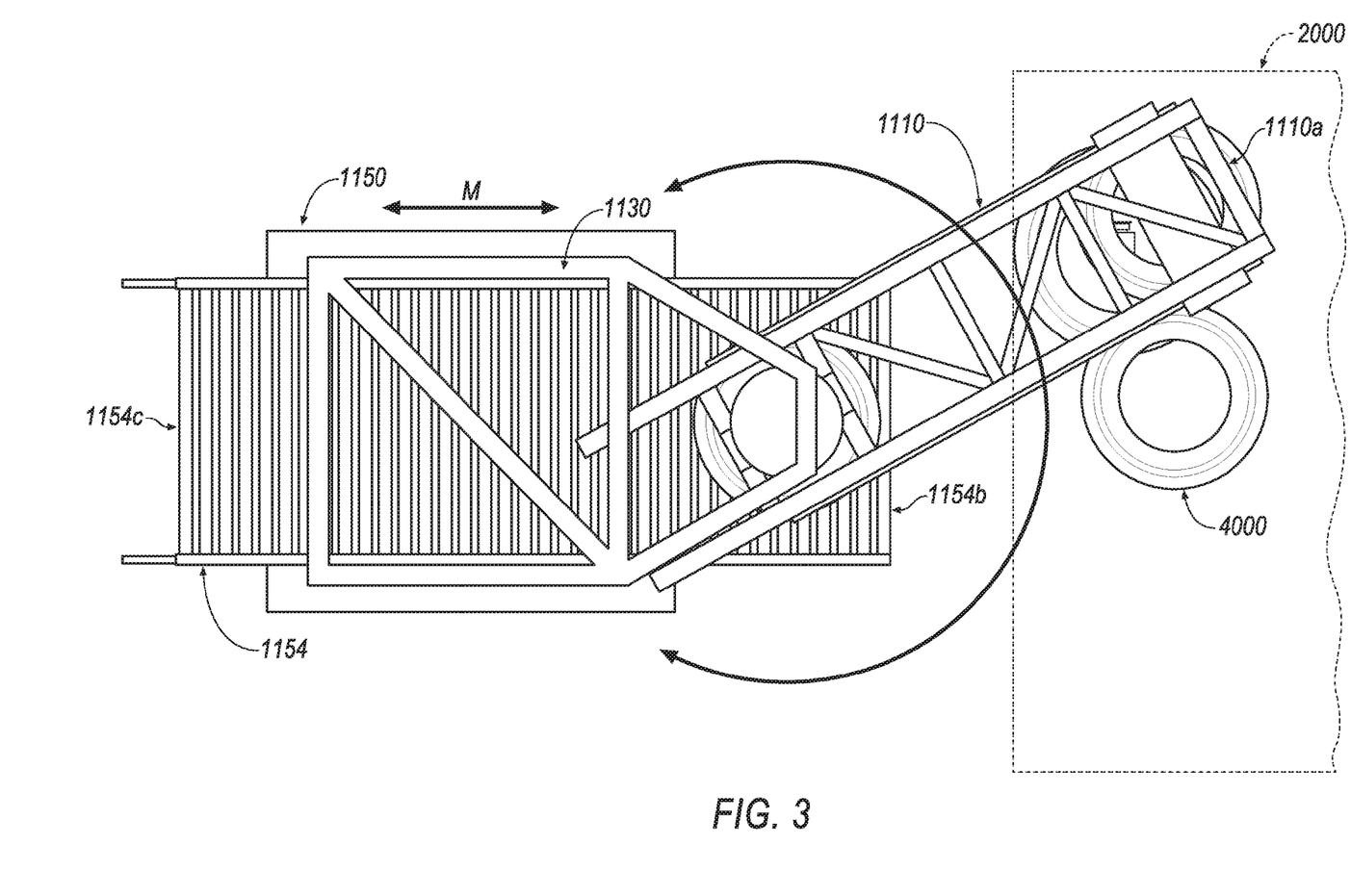
FIG. 3 is top view of the tire unloader of FIG. 2.

Referring to FIG. 3, after the unloading cart 1150 travels proximate to the transporting vehicle 2000, the unloading end 1110a of the boom 1110 extends into the transporting vehicle 2000 above a stack of tires 40000. The unloading end 1110a of the boom 1110 rotates to access stacks of tires 4000 residing at various locations within the transporting vehicle 2000. The range of rotation of the unloading end 1110a of the boom 1110 is limited by the walls of the transporting vehicle 2000. Accordingly, the unloading end 1110a of the boom 1110 illustrated in FIG. 3 contracts back toward the support structure 1130 to unload the stack of tires 4000 onto the conveyor 1154.

As illustrated in the embodiments of FIGS. 4A, 4B, 4C, 4D, and 5-7, at least one of the support structure 1130 or the boom 1110 optionally utilize a more compact design than the support structure 1130 and boom 1110 as illustrated in the embodiments of FIGS. 1-3.

As illustrated in the embodiments of FIGS. 4A, 4B, 4C, and 4D, a drive mechanism 1113 deploys the robotic device, consisting of the extendable support column 1112 and the end effector 1116. After deployment from the boom 1110, the end effector 1116 is positioned to engage the stack of tires 4000. The extendable support column 1112 resides within the boom 1110 and, when deployed, rolls over an edge to extend vertically downward from the boom 1110. In an embodiment, the extendable support column 1112 may be fabricated from a series of links that are joined end-to-end by pivot pins (similar to the construction technique used for bicycle chains).

FIGS. 4A, 4B, 4C, and 4D illustrate the operational actions of the robotic device according to one exemplary implementation of the disclosure.

The drive mechanism 1113 actuates to lower or raise the extendable support column 1112. An end effector 1116, which receives control signals from an end effector controller 1117, is attached to the extendable support column 1112. A camera controller 1121 electrically communicates with two video cameras 1120, one horizontal 1120a and one vertical 1120b. In other embodiments of the disclosure, the video cameras 1120 are optionally aligned differently or the system optionally includes additional video cameras 1120. Any number or alignment of the video cameras 1120 that provides the remote operator with sufficient video feed to operate the system is within the spirit of this disclosure. A remote operator 3000 views the video feed from the video cameras 1120 on a remote operation screen 3100.

The horizontal video camera 1120a provides video from the unloading end 1110a of the boom 1110, allowing the remote operator 3000 to view the position of the unloading end 1110a of the boom 1110 as it extends into the transporting vehicle 2000.

The vertical video camera 1120b provides video of the end effector 1116, allowing the remote operator 3000 to view the position of the end effector 1116 as the extendable support column 1112 lowers the end effector 1116 into a stack of tires 4000.

The remote operator controls the unloading cart 1150, the drive mechanism 1113, and the boom 1110 utilizing a wireless communication signal 3200, such as a radio signal.

Figure 4A:
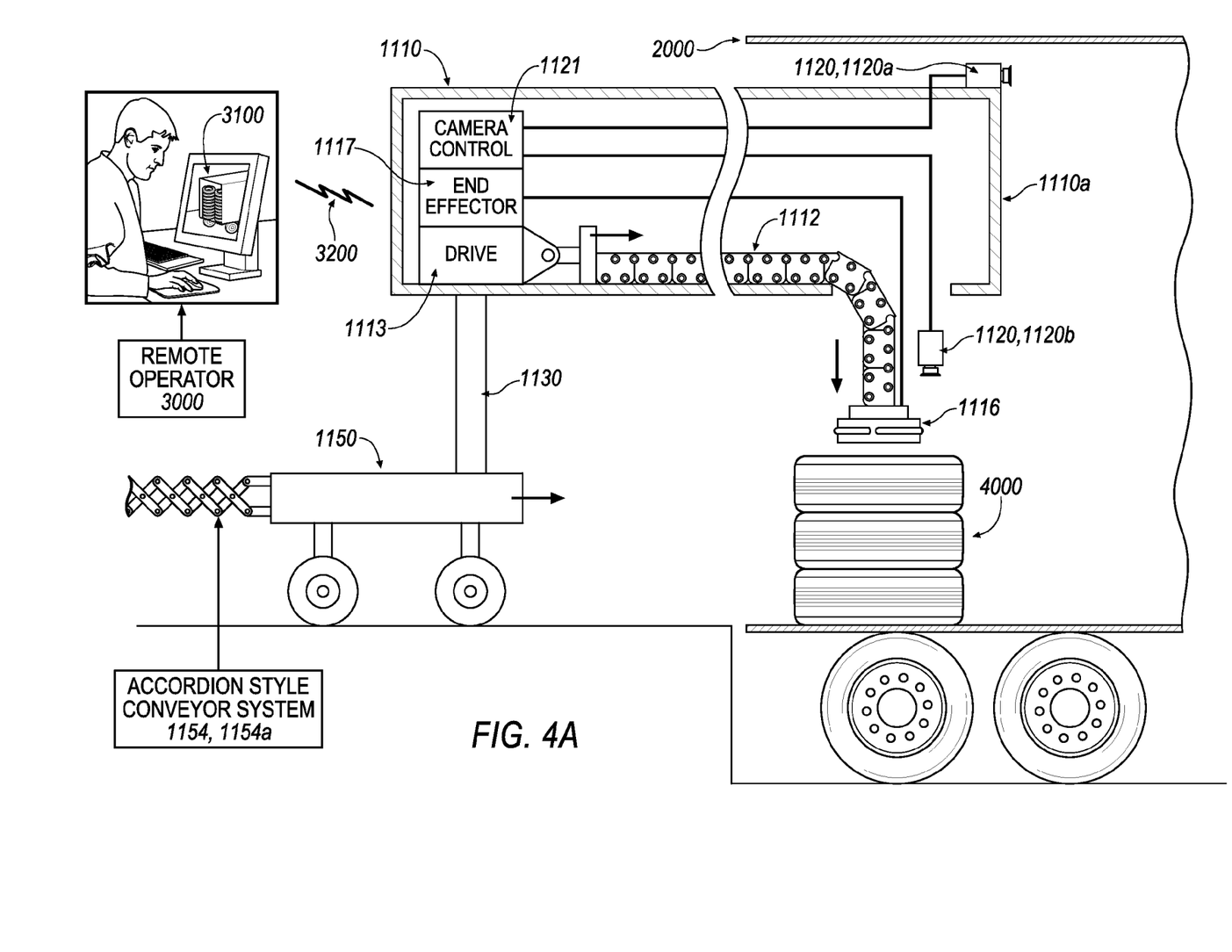

Referring to FIG. 4A, as directed by the remote operator 3000, the unloading cart 1150 has advanced and the unloading end 1110a of the boom 1110 has been extended or rotated to position the end effector 1116 above a stack of tires 4000. The remote user 3000 then signals the drive mechanism 1113 to begin lowering the extendable support column 1112 and the end effector 1116.

The vertical video camera 1120b feeds video of the position of the end effector 1116 to the remote operation screen 3100. This video allows the remote operator 3000 to lower the end effector into the center of the stack of tires 4000. In some implementations, the vertical video camera 1120b remains stationary. In other implementations, the vertical video camera 1120b lowers with the end effector 1116. In such implementations where the vertical video camera 1120b lowers, the video feed to the camera controller 1121 can be wireless or the feed can be wired, for example with a wire traveling through the extendable support column 1112.

Figure 4B:
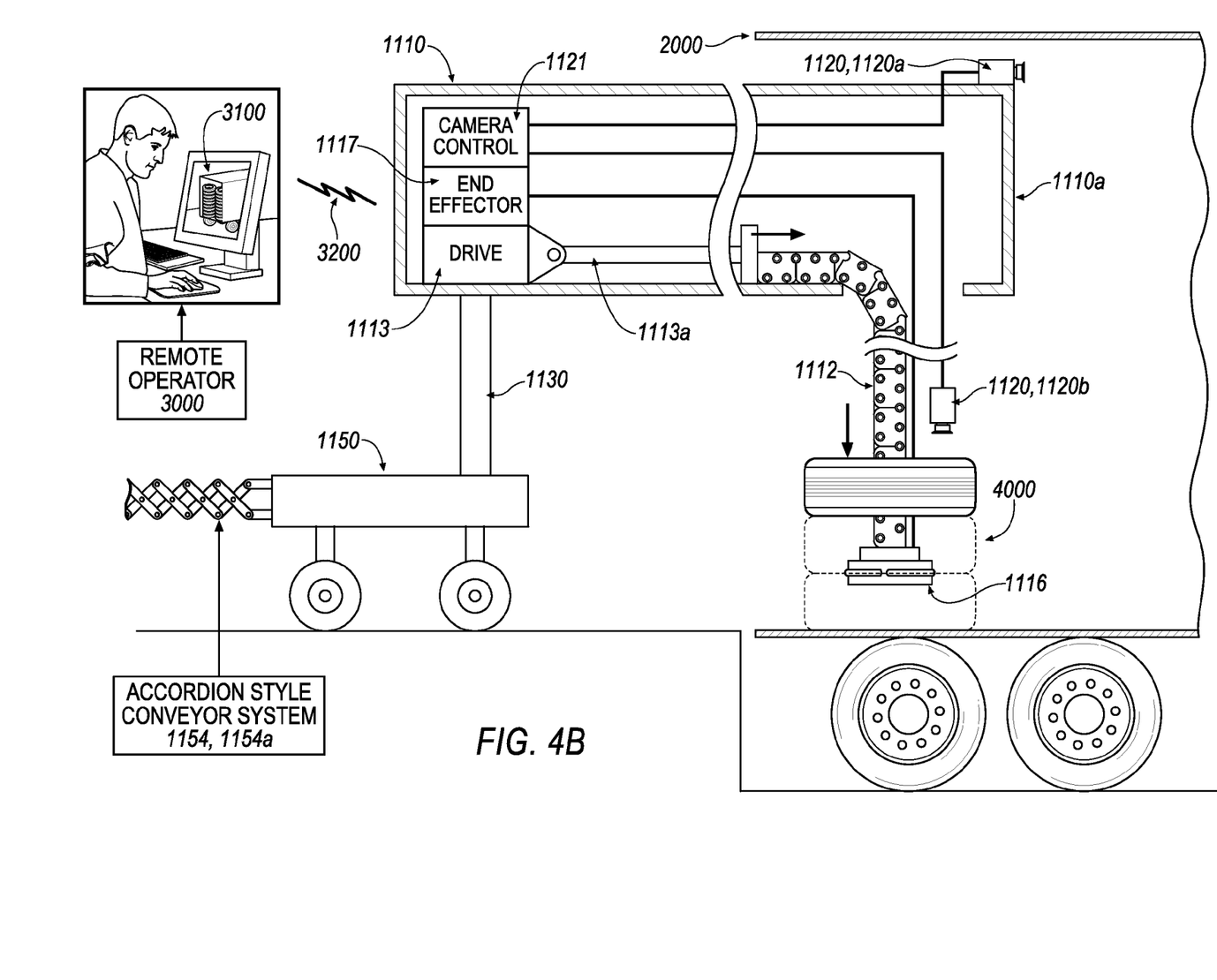
FIG. 4B shows the unloader of FIG. 4A after the end effector has been lowered into the stack of tires.

Referring to FIG. 4B, the drive mechanism 1113 extends an extendable drive bar 1113a to lower the extendable support column 1112 and the end effector 1116. In the implementation of FIG. 4B, the extendable support column 1112 consists of a mechanical roller chain. As the links of the roller chain are driven from a horizontal position to a vertical position at the edge of the boom 1110, the links engage with one another and stiffen to create a rigid, self-supporting vertical extendable support column 1112, which securely lowers the end effector 1116 into the center of a stack of tires 4000.

The remote operator 3000 utilizes the video feed displayed on the remote operation screen 3100 from the vertical video camera 1120b to stop the drive mechanism 1113 when the extendable support column 1112 has lowered the end effector 1116 to a desired position within the stack of tires 4000.

Figure 4C:
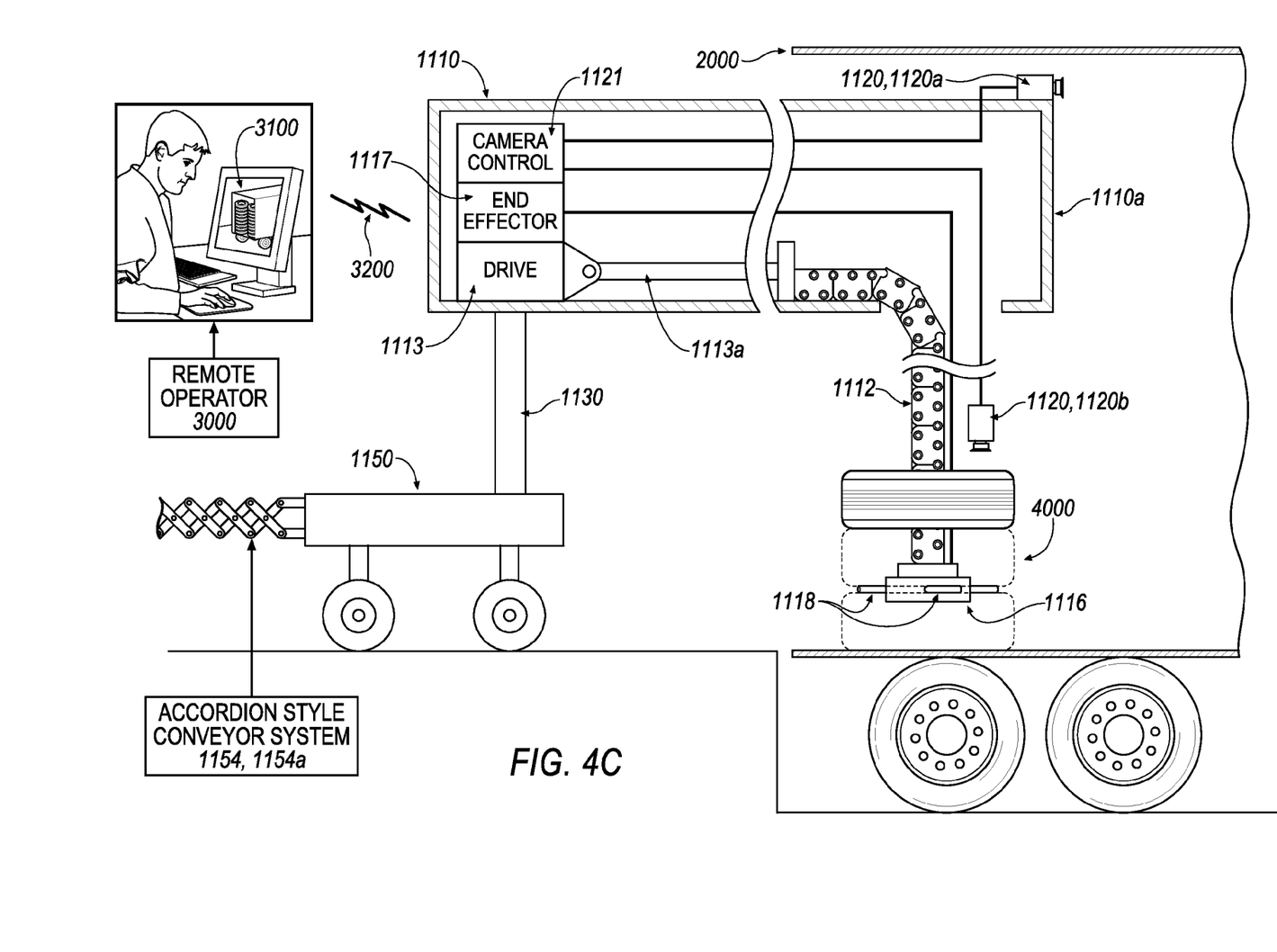
FIG. 4C shows the unloader of FIG. 4A after the end effector has extended its retractable fingers to engage the stack of tires.

Referring to FIG. 4C, the remote operator 3000 directs the end effector controller 1117 to extend the retractable fingers 1118 of the end effector 1116, engaging the stack of tires 4000. In other embodiments, engagement of the stack of tires 4000 is accomplished when the end effector 1116 utilizes an engagement mechanism other than retractable fingers 1118.

Figure 4D:
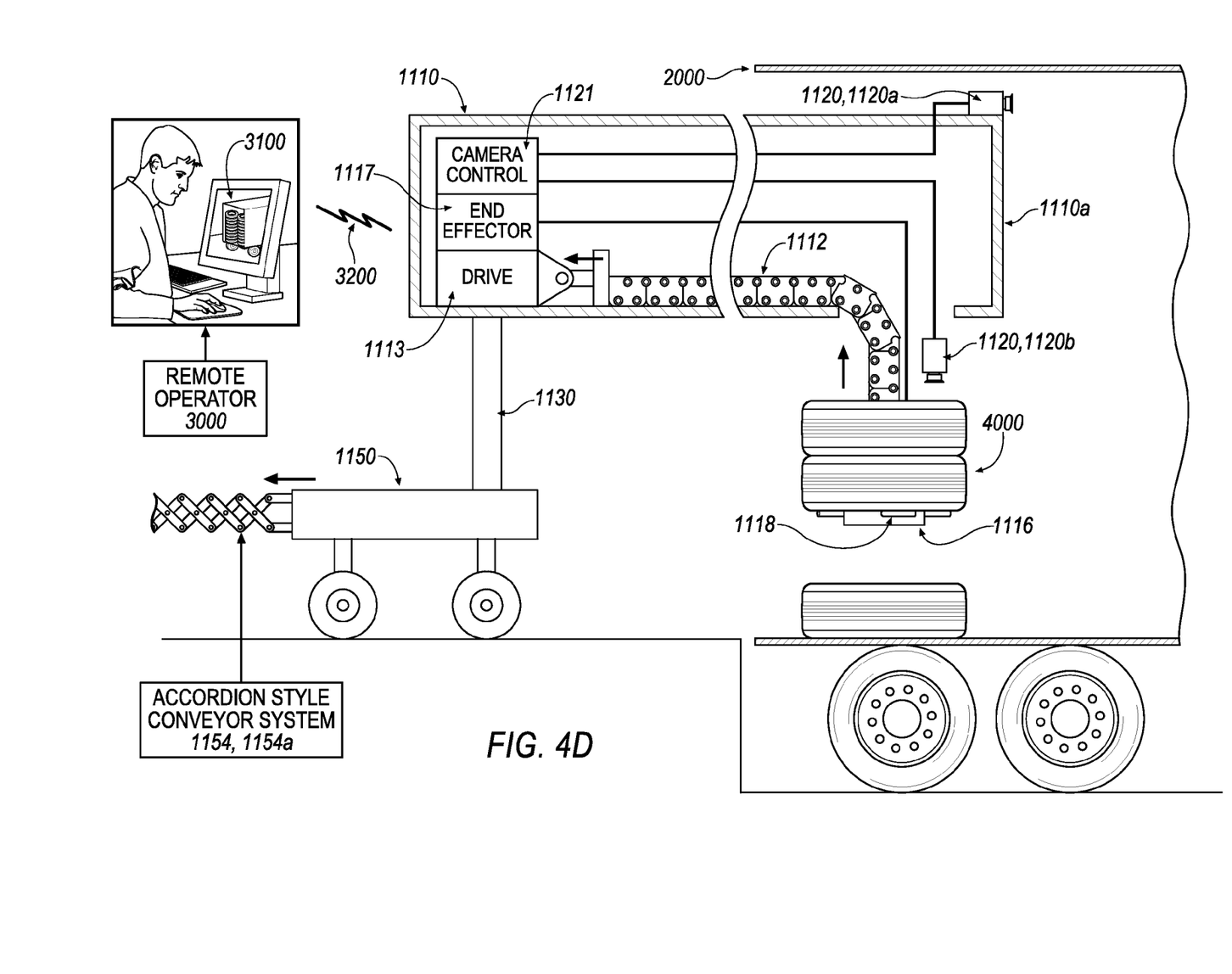
FIG. 4D shows the unloader of FIG. 4A lifting the stack of tires.

Referring to FIG. 4D, the remote operator 3000 directs the drive mechanism to raise the extendable support column 1112 and the end effector 1116, lifting the stack of tires 4000.

Figure 5:
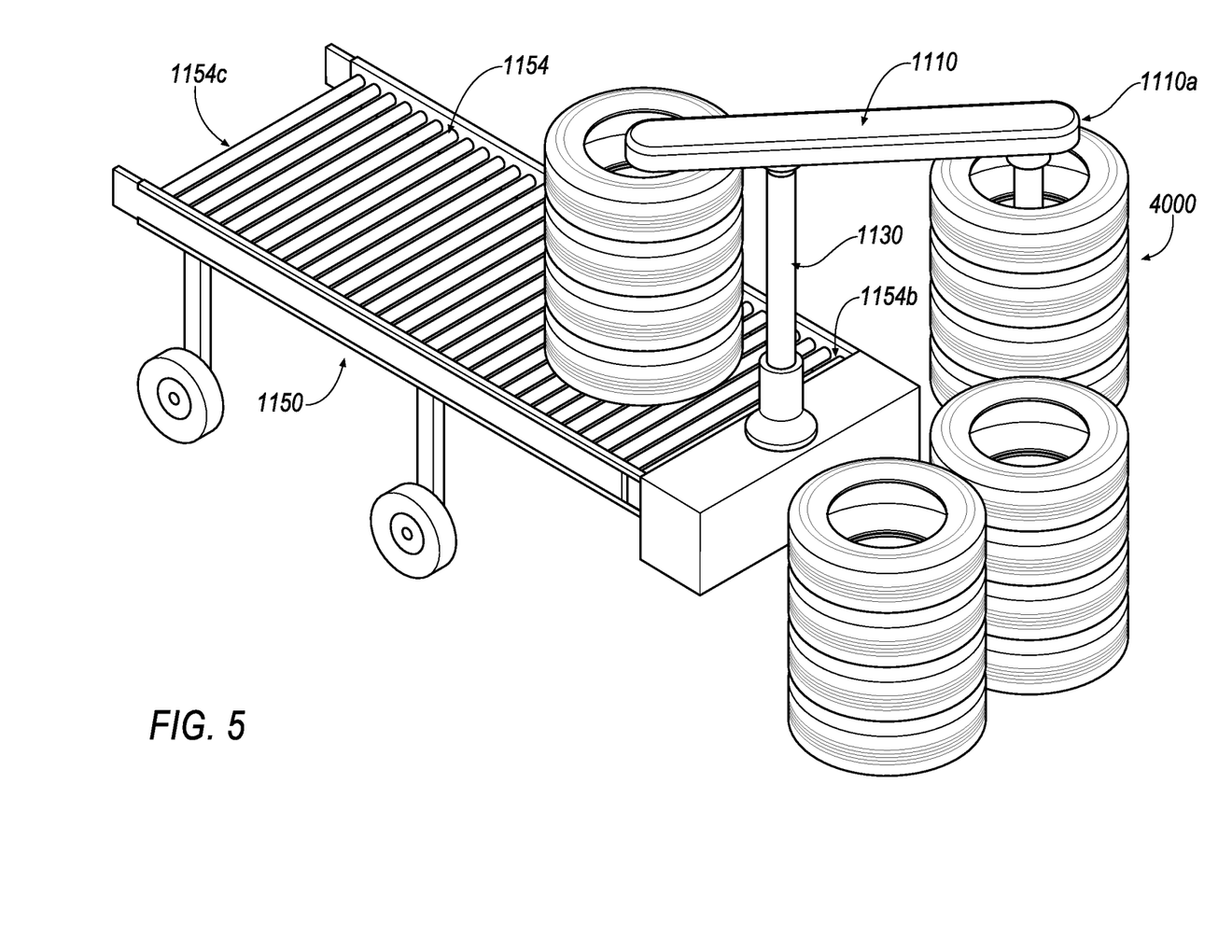
FIG. 5 is an isometric view of a tire unloader according to another exemplary embodiment of the invention.
Figure 6:
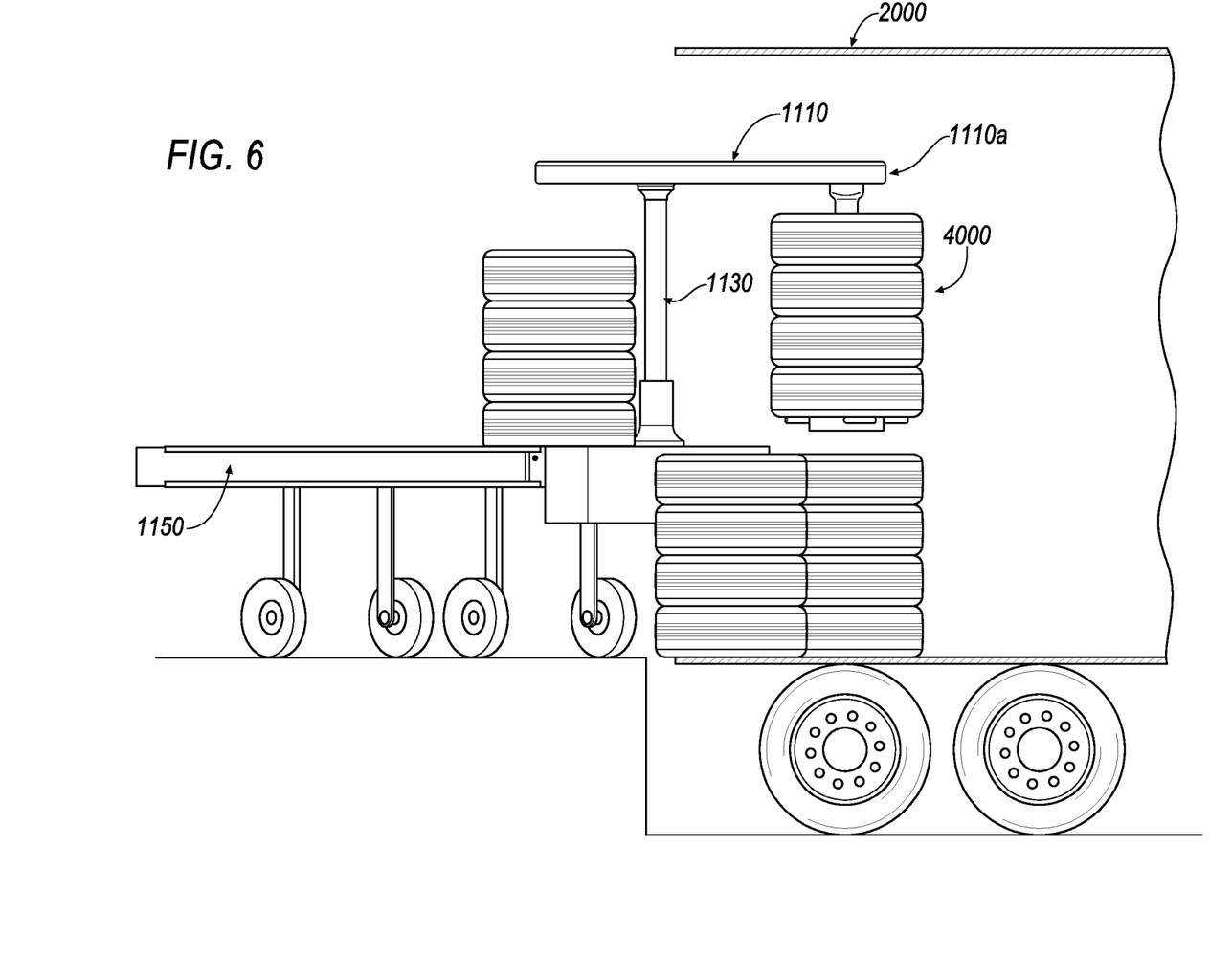
FIG. 6 is a side view of the tire unloader of FIG. 5 as it operates within a trailer.
Figure 7:
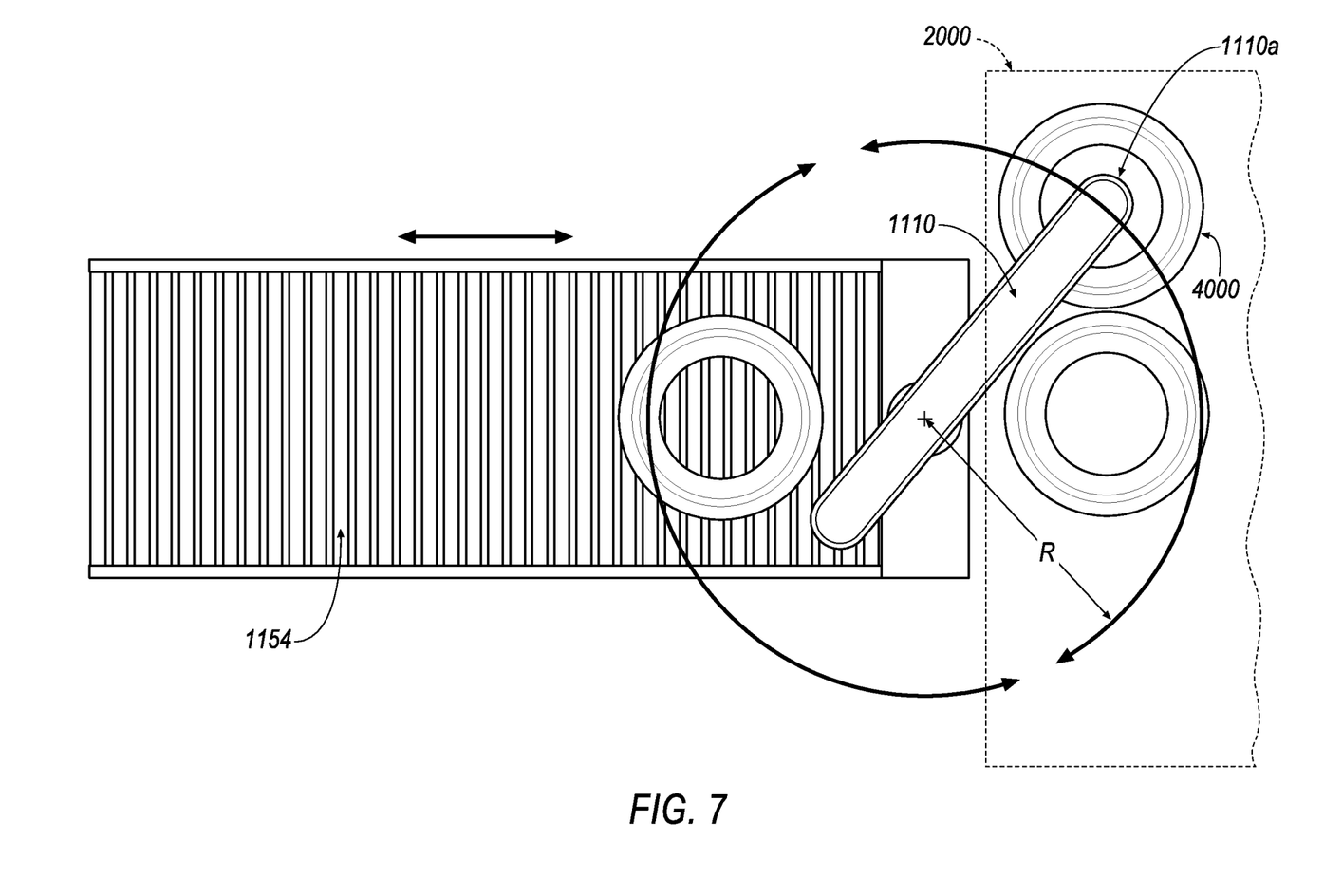
FIG. 7 is a top view of the tire unloader of FIG. 5 as it operates within a trailer.

Referring to FIGS. 5-7, in some implementations, after lifting the stack of tires 4000, the unloading end 1110a of the boom 1110 rotates to move the lifted tires out of the transporting vehicle 2000 and onto the conveyor 1154 at its first end 1154b.

Referring to FIG. 7, the rotational radius R of the unloading end 1110a of the boom 1110 must be small enough to rotate the stack of tires 4000 to the conveyor 1154 without the stack of tires 4000 colliding into the side wall of the transporting vehicle 2000.

If the rotational radius R of the unloading end 1110a of the boom 1110 is too large to avoid a collision, then the unloading end 1110a of the boom 1110 is contracted back towards the support structure 1130 until the rotational radius R of the unloading end 1110a of the boom 1110 has decreased to avoid such a collision.

The implementations of FIGS. 1-7 show a tire unloader utilized to unload stacks of tires 4000 from a transporting vehicle 2000. However, the unloading system 1000 of this disclosure is not limited to unloading tires from a vehicle.

A number of implementations have been described. Nevertheless, it will be understood that various modifications may be made without departing from the spirit and scope of the disclosure. Accordingly, other implementations are within the scope of the following claims.

What is claimed is:

1. A material unloading system, comprising:
   a conveyor having a workpiece support surface, wherein the workpiece support surface defines a conveyor length extending between a proximal end of the conveyor and a distal end of the conveyor;
   a cart movably-connected to the conveyor for movement relative the conveyor along the conveyor length;
   a support structure supported by the cart;
   a boom having a proximal end and a distal end, wherein a proximal end of the boom is coupled to the support structure;
   an extendable support column coupled to the distal end of the boom;
   a first camera fixedly-connected to the boom; and
   a second camera non-fixedly-connected to and extendable from the boom.

2. The material unloading system of claim 1, wherein the first side of the conveyor defines a first side rail of the conveyor, wherein the second side of the conveyor defines a second side rail of the conveyor, wherein the cart is further defined by a first side portion and a second side portion, wherein the first side portion of the cart is slidably-coupled to the first side rail of the conveyor and wherein the second side portion of the cart is slidably-coupled to the second side rail of the conveyor for movably-connecting the cart to the conveyor such that the cart is arranged for slidable movement relative to the conveyor along the conveyor length.

3. The material unloading system of claim 1, wherein the conveyor includes an accordion-style conveyor portion.

4. The material unloading system of claim 1, wherein the distal end of the boom includes a workpiece interface portion.

5. The material unloading system of claim 1, wherein the cart is remotely controllable.

6. The material unloading system of claim 1, further comprising:
   an end effector connected to a distal end of the extendable support column, wherein the end effector includes at least one retractable finger.

7. The material unloading system of claim 1, wherein the first camera is arranged near the distal end of the boom, wherein the second camera is arranged near the distal end of the boom, wherein the first camera directed in the vertical direction relative the distal end of the boom, wherein the second camera directed in a horizontal direction relative the distal end of the boom.

8. The material unloading system of claim 1, wherein the second camera is non-fixedly-connected to the boom for movement with the extendable support column.

9. The material unloading system of claim 1, wherein the second camera is non-fixedly-connected to the boom for independent movement relative to the extendable support column.

10. The material unloading system of claim 1, further comprising:
    a workpiece destacker arranged near the distal end of the conveyor that is operable to remove a workpiece from the workpiece support surface of the conveyor.

11. The material unloading system of claim 10, further comprising:

a transporting cart arranged near the workpiece destacker, wherein the workpiece destacker is operable to deposit the workpiece on the transporting cart.

12. The material unloading system of claim 11, wherein the workpiece includes at least one tire, wherein the at least one tire includes a stack of tires.

13. The material unloading system of claim 1, wherein the distal end of the boom is configured to translate in a horizontal direction.

14. The material unloading system of claim 13, wherein a rotational radius of the distal end of the boom is variable.

15. A material unloading system, comprising:
a cart;
a support structure supported by the cart;
a boom coupled to the support structure for rotation about an axis, the boom including an unloading end defining a rotational radius; and
an extendable support column translatably coupled to the boom, the extendable support column operable to extend in a vertical direction, wherein the extendable support column includes a self-supportable mechanical roller chain.

16. A material unloading system comprising:
a conveyor having a workpiece support surface, wherein the workpiece support surface defines a conveyor length extending between a proximal end of the conveyor and a distal end of the conveyor;
a cart movably-connected to the conveyor for movement relative the conveyor along the conveyor length;
a support structure supported by the cart;
a boom having a proximal end and a distal end, wherein a proximal end of the boom is coupled to the support structure;
a support column extending from the distal end of the boom;
a first camera fixedly-connected to the distal end of the boom, wherein the first camera is directed in a first direction relative the boom; and
a second camera non-fixedly-connected to and extendable from the distal end of the boom, wherein the second camera is directed in a second direction relative the boom, wherein the second direction is different from the first direction.

17. The material unloading system of claim 16, wherein the first direction is a horizontal direction, wherein the second direction is a vertical direction.

18. The material unloading system of claim 16, wherein at least one of the boom and the support column is remotely controllable.

19. The material unloading system of claim 16, further comprising:
a vehicle having a storage area, wherein the boom is operable to extend within a cavity of the vehicle defined by headroom defined by a vertical dimension extending between an inner surface of an upper panel of the vehicle and an upper end surface of a stack of workpiece material.

20. The material unloading system of claim 16, wherein the first camera directed in the vertical direction relative the distal end of the boom, wherein the second camera directed in a horizontal direction relative the distal end of the boom.

21. The material unloading system of claim 16, wherein the second camera is non-fixedly-connected to the boom for movement with the extendable support column.

22. The material unloading system of claim 16, wherein the second camera is non-fixedly-connected to the boom for independent movement relative to the extendable support column.

23. The material unloading system of claim 16, wherein the first side of the conveyor defines a first side rail of the conveyor, wherein the second side of the conveyor defines a second side rail of the conveyor, wherein the cart is further defined by a first side portion and a second side portion, wherein the first side portion of the cart is slidably-coupled to the first side rail of the conveyor and wherein the second side portion of the cart is slidably-coupled to the second side rail of the conveyor for movably-connecting the cart to the conveyor such that the cart is arranged for slidable movement relative to the conveyor along the conveyor length.

24. The material unloading system of claim 23, wherein the conveyor includes an accordion-style conveyor portion.

25. A material unloading system comprising:
a support structure;
a boom extending from the support structure, the boom including an unloading end operable to move in a first direction;
a support column extending from the unloading end, the support column operable to move in a second direction transverse to the first direction;
a first camera directed in the first direction; and
a second camera directed in the second direction, wherein the extendable support column includes a self-supportable mechanical roller chain.

* * * * *